Figure 1:
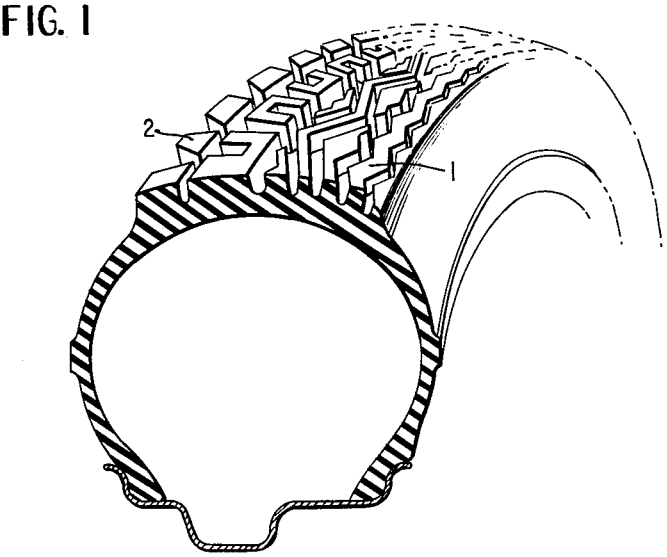

INVENTORS
WILLIE ELLENRIEDER
RUDOLF HENNECKE
BY Dicke & Craig
ATTORNEYS

United States Patent Office 3,162,229
Patented Dec. 22, 1964

3,162,229
SNOW TIRE
Willy Ellenrieder, 73 Esslingen A.N., Hoelderlingweg, Germany, and Rudolf Hennecke, 22 Hohenstaufenstrasse, Ebersbach, Fils, Germany
Filed Apr. 5, 1963, Ser. No. 270,981
Claims priority, application Germany, Apr. 17, 1962, D 38,705
12 Claims. (Cl. 152—209)

The present invention relates to a motor vehicle snow tire with a so-called "M and S" tread, that is with a tread design which produces a good traction in mud "M" and snow "S" by reason of the tread grooves of the tire.

The cross section of the channels or ducts of such "M and S" tread design in one sense are advantageous since by reason of the relatively wide transverse grooves of the tread design a slipping in the circumferential direction is far-reachingly prevented during acceleration or braking of the vehicle, however, on the other hand, this design is disadvantageous since the lateral guidance is not very well satisfied for the same reasons. According to the present invention, this drawback is obviated by providing at one shoulder of the tire a continuous or uninterrupted rib of tread design while providing the remaining part of the tire tread surface including the other shoulder with an "M and S" tread design that is discontinuous or interrupted in the circumferential direction. With such an arrangement the one continuous shoulder rib may by reason of its uninterrupted edge take over the lateral guidance and the other interrupted shoulder rib may ensure a good transmission of the forces in the circumferential direction to the road surface. The construction of the tire tread design according to the present invention, therefore, is in clear contrast to a prior art construction in which both shoulder ribs extend continuously, that is uninterruptedly, and only the center part of the tread surface disposed therebetween is provided with the "M and S" tread design. While such prior art tire as last described has a good lateral guidance, it loses considerable driving or braking gripping power on snow covered roads due to the fact that both shoulder ribs owing to the uninterrupted configuration thereof, provide more support for the tire than the parts of the tire tread disposed therebetween which have the transverse interruptions needed for traction under such conditions. The tire therefore rides up on the shoulder ribs causing loss of efficiency of the "M and S" tread portion. With a tire constructed in accordance with the present invention, in contradistinction thereto, the "M and S" tread design is utilized fully for the supporting function because this problem relating to the second uninterrupted shoulder rib is dispensed with in accordance with the present invention.

It is proposed that the tire constructed in accordance with the present invention be arranged on the motor vehicles so that the tire side on which is disposed the uninterrupted shoulder rib will be disposed on the vehicle outside, that is facing outwardly of the vehicle. In this manner the uninterrupted shoulder ribs, particularly suitable for the support of lateral forces, are located in the correct place in connection with the vehicle wheels which, located on the outside of the curve, are more strongly loaded while driving through a curve. Additionally, the so-called "polygon"-wear does not occur in an arrangement according to the present invention. The appearance of the polygon wear may be found with non-driven wheels in particular at the outer shoulder rib of the tire when the latter is provided with transverse interruptions and consists in a deviation from the original circular form of the tread surface which assumes the configuration of a polygon.

Within the area of the continuous shoulder rib, the tire tread design according to the present invention is similar to the profile of a normal or summer tire whereas the transversely interrupted other shoulder rib has the characteristics of an "M and S" snow tire. If, as additionally proposed in accordance with the present invention, the tread design is permitted to become increasingly coarse between the two shoulders, then one obtains a tire which is satisfactory both with snow and slush as well as with a dry road. The uniform increase of the coarseness of the grooves, i.e., of the size of the channels in the tread design, from one side of the tire to the other has the additional advantage with respect to a random distribution of coarse and fine ribs in the tire transverse direction that by reason of the smooth or steady transition, the entire tire unit is subjected to smaller loads. This compromise solution of a snow tire that may be used with all road conditions may also be applied with success to a tire which does not possess any uninterrupted shoulder rib.

As regards the arrangement at the motor vehicle of such tires having an increasing coarseness in the size of the channels or grooves from one side of the tire to the other, it is proposed in accordance with the present invention to locate the finer side of the tread design in the direction toward the vehicle outside. If the tire is provided with a continuous or uninterrupted shoulder rib, then such shoulder rib is located on the finer side of the tread design, and this side, for reasons already pointed out hereinabove, should be located on the vehicle outside. In addition for tires without continuous or uninterrupted shoulder ribs, the side with the finer tread design should come to lie as much as possible on the outside because the aforementioned polygon wear occurs particularly on the outside and becomes worse the coarser the cross section of the channels or grooves thereat.

Accordingly, it is an object of the present invention to provide a snow tire which may be utilized under all road conditions, assures satisfactory traction and gripping as well as sufficient lateral guidance of the tire.

It is another object of the present invention to provide a snow tire that offers good traction in snow and slush as well as on dry roads and eliminates the so-called polygon wear that has been encountered heretofore with snow tires having so-called "M and S" tread designs.

Another object of the present invention resides in the provision of a combined snow tire in which the tread design, assuring the necessary traction and gripping in snow and slush, is rendered suitable and effective under all driving conditions.

Still a further object of the present invention resides in the provision of a tire construction in which the forces produced while driving through a curve are absorbed readily without impairing the gripping power of the tire.

Another object of the present invention resides in the provision of a tire in which the entire tire is subject to smaller loads than has been feasible heretofore.

Figure 2:
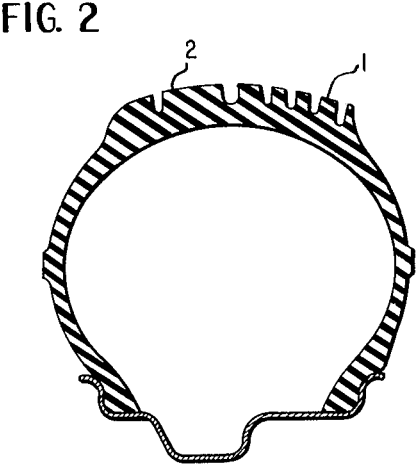

These and other objects, features and advantages of the present invention will become more obvious from the following description when taken in connection with the accompanying drawing which shows, for purposes of illustration only, one embodiment in accordance with the present invention and wherein:

FIGURE 1 is a partial perspective view, with parts cut off, of a first embodiment of a combined tire in accordance with the present invention, and FIGURE 2 is a partial perspective view, similar to FIGURE 1, of a modified embodiment of a combined tire in accordance with the present invention.

Referring now to the drawing which shows in partial perspective view, with parts broken away, several embodiments in accordance with the present invention and in which like reference numerals are used throughout the two views to designate like parts, the shoulder rib designated therein by reference numeral 1 extends continuously and uninterruptedly over the entire circumference of the tire whereas the other coarsely channelled or grooved shoulder 2 is provided with significant transverse interruptions. Going from right to left, as viewed in the tire cross section of the two figures of the drawing, the character of the tread design changes gradually and steadily from a tread cross section with narrow channels or grooves by way of a tread cross section of medium size channels or grooves to a tread cross section of larger coarse channels or grooves.

The shoulders may be provided with well defined corners, as seen in cross section, however, they may also be constructed with a rounded-off corner or with corners offset in a step-like manner. In FIGURE 1 the shoulder rib 1 has a curved contour and the shoulder rib 2 an angular configuration. In FIGURE 2, the shoulder rib 1 is of angular contour and the shoulder rib 2 is provided with a rounded contour, it being understood, however, that tire corners, either curved, with angular corners or having step-like offsets may also be provided at both shoulders.

While we have shown and described several embodiments in accordance with the present invention, it is understood that the same is not limited thereto but is susceptible of numerous changes and modifications as known to a person skilled in the art. For example, the particular tread design may be varied as is well known. Consequently, since the present invention is susceptible of numerous changes and modifications within the spirit and scope thereof, we do not wish to be limited to the details shown and described herein but intend to cover all such changes and modifications as are encompassed by the scope of the appended claims.

We claim:

1. A motor vehicle snow tire with an "M and S" tread design and provided with two tire shoulders, characterized in that one tire shoulder has an uninterrupted tread design rib whereas substantially the remaining portion of the tire tread surface including the other shoulder is provided with an "M and S" tread design interrupted in the circumferential direction, the tread design becoming increasingly coarse from said one shoulder rib to the other.

2. A motor vehicle snow tire with an "M and S" tread design and provided with two tire shoulders, characterized in that one tire shoulder has at least a relatively very fine tread design whereas tread design becomes increasingly coarse over the remaining portion of the tire tread surface in the direction toward the other shoulder rib and is provided thereat with a relatively very coarse "M and S" tread design interrupted in the circumferential direction.

3. A motor vehicle snow tire with an "M and S" tread design and provided with two tire shoulders, characterized in that one tire shoulder has an uninterrupted tread design rib whereas substantially the remaining portion of the tire tread surface including the other shoulder is provided with an "M and S" tread design interrupted in the circumferential direction, the tire side on which is located the uninterrupted shoulder rib forming the side located on the outside of the vehicle, the tread design becoming increasingly coarse from said one shoulder rib to the other.

4. A motor vehicle tire with a profiled tread between two profile shoulders, and subdivided by longitudinal grooves extending in the circumferential direction of the tire as well as by cross-grooves, comprising a first tread portion adjacent to one of the tire shoulders, a second tread portion within the center of said profile and having cross-grooves more pronounced as to direction as well as to the tire contour than said first tread portion, and a third tread portion having adjacent to the other tire shoulder and having cross-grooves still more pronounced as to the direction as well as relative to the tire contour than said second tread portion so that the profile viewed from the first-mentioned toward the second-mentioned shoulder becomes progressively coarser, and whereby the three above-mentioned tread portions form the entire profiled tread of the tire.

5. A motor vehicle tire according to claim 4, whereby there is provided a profile web extending continuously in circumferential direction only and exclusively within that half of the profiled tread which is adjacent to the first-mentioned tire shoulder.

6. A motor vehicle tire according to claim 5, whereby solely one profile web extending continuously in circumferential direction is provided and whereby said profile web is arranged immediately at the first-mentioned tire shoulder.

7. A motor vehicle tire according to claim 5, whereby a profile web extending continuously in circumferential direction is arranged immediately at the first-mentioned tire shoulder and whereby in addition thereto and at a distance therefrom solely one other profile web extending continuously in circumferential direction is arranged at that half of the profile tread which is adjacent to the first-mentioned tire shoulder, specifically at the joint of the first and the second tread portions.

8. A motor vehicle tire according to claim 4, wherein the tire shoulder adjacent to said first tread portion has a rounded contour and the tire shoulder adjacent to said third tread portion has an angular contour.

9. A motor vehicle tire with a profiled tread between two profile shoulders, and subdivided by longitudinal grooves extending in circumferential direction of the tire, as well as by cross-grooves whereby one half of the profiled tread of the tire, located between the center plane of the profile and one of the tire shoulders, is provided with profile webs extending continuously in circumferential direction as well as with profile webs divided into separate blocks by longitudinal grooves and cross-grooves while the other half of the profiled tread of the tire, located between the center plane of the tire and the other tire shoulder, is provided exclusively with profiled webs which are divided into blocks by cross-grooves and longitudinal grooves.

10. A motor vehicle tire according to claim 9 whereby solely one profile web extending continuously in circumferential direction is arranged immediately at the first-mentioned tire shoulder.

11. A motor vehicle tire according to claim 10, wherein said one tire shoulder has a rounded contour and said other tire shoulder has an angular contour.

12. A motor vehicle tire according to claim 9, whereby a profiled web extending continuously in circumferential direction is arranged immediately adjacent to the first-mentioned tire shoulder and whereby in addition to said profiled web there is arranged solely one other profiled web extending continuously in circumferential direction at a distance from the first-mentioned profiled web with the insertion of profile blocks between the first-mentioned profiled web and the center plane of the profile.

References Cited by the Examiner

UNITED STATES PATENTS 2,534,869   12/50   Jones _____ 152—209

FOREIGN PATENTS 802,268   10/58   Great Britain.

ARTHUR L. LA POINT, *Primary Examiner.*